United States Patent [19]

Ritter et al.

[11] Patent Number: 5,460,253
[45] Date of Patent: Oct. 24, 1995

[54] CLUTCH DESIGNED AS ROLLER FREE-WHEEL FOR TRANSMITTING A TORQUE ACTING IN BOTH DIRECTIONS OF ROTATION

[75] Inventors: Joachim Ritter; Ernst Neuwirth, both of Herzogenaurach; Harold Hochmuth, Emskirchen, all of Germany

[73] Assignee: Ina Walzlager Schaeffler KG, Germany

[21] Appl. No.: 211,752

[22] PCT Filed: Oct. 8, 1992

[86] PCT No.: PCT/EP92/02315

§ 371 Date: Apr. 13, 1994

§ 102(e) Date: Apr. 13, 1994

[87] PCT Pub. No.: WO93/08410

PCT Pub. Date: Apr. 29, 1993

[30] Foreign Application Priority Data

Oct. 17, 1991 [DE] Germany .................. 41 34 352.0

[51] Int. Cl.[6] .................. F16D 15/00; G06G 5/16
[52] U.S. Cl. .................. 192/8 R; 297/374
[58] Field of Search .................. 192/7, 8 R, 38, 192/44, 16; 188/82.84; 297/361.1, 374

[56] References Cited

U.S. PATENT DOCUMENTS

| | | | |
|---|---|---|---|
| 1,015,861 | 1/1912 | Warner | 192/8 R |
| 1,471,398 | 10/1923 | Inglis | 192/8 R |
| 2,209,122 | 7/1940 | Houplain . | |
| 2,914,153 | 11/1959 | Krause et al. . | |
| 3,169,505 | 2/1965 | Spraragen | 192/8 R X |
| 3,218,886 | 11/1965 | Bacchi et al. | 192/8 R X |
| 3,243,023 | 3/1966 | Boyden | 192/8 R |
| 3,319,747 | 5/1967 | Lauper | 192/8 R |
| 3,499,511 | 3/1970 | Bouhot | 192/7 X |
| 3,586,143 | 6/1971 | Hutchinson et al. . | |
| 3,648,813 | 3/1972 | Walters et al. | 192/38 X |
| 4,901,831 | 2/1990 | Kenichiro Ito et al. | 192/38 |

FOREIGN PATENT DOCUMENTS

| | | | |
|---|---|---|---|
| 1312614 | 11/1962 | France . | |
| 565023 | 11/1932 | Germany | 192/44 |
| 2323640 | 12/1973 | Germany . | |
| 1179105 | 1/1970 | United Kingdom | 192/8 R |

*Primary Examiner*—Rodney H. Bonck
*Attorney, Agent, or Firm*—Bierman and Muserlian

[57] ABSTRACT

A free-running roller coupling transmits in both directions of rotation a torque between two structural members. This coupling has an outer ring in which clamping tracks are formed by recesses. An inner element has a cylindrical clamping track. Pairs of clamping rollers, prestressed by a pressure spring against the ramp-like end of each clamping track, are arranged between the clamping track of the inner element and the clamping tracks of the outer ring. An unblocking arrangement has comb-like carriers that extend through slots in an edge of the outer ring, which carriers can unblock the rollers while allowing the outer ring to be driven by a switching sleeve.

3 Claims, 1 Drawing Sheet

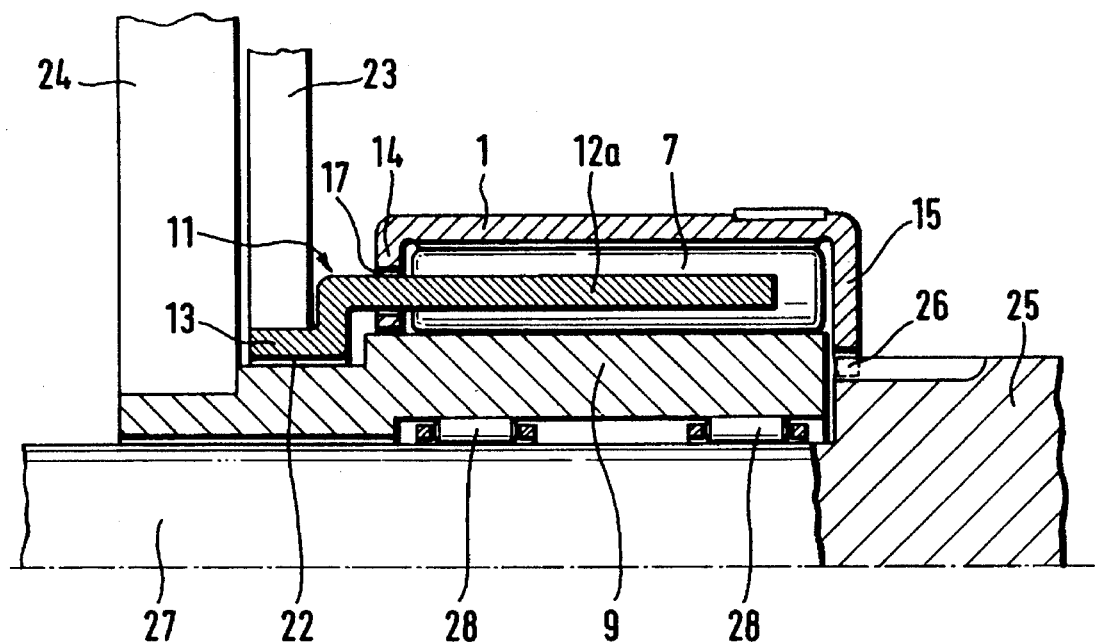

CLUTCH DESIGNED AS ROLLER FREE-WHEEL FOR TRANSMITTING A TORQUE ACTING IN BOTH DIRECTIONS OF ROTATION

The invention relates to a clutch designed as roller free-wheel for transmitting a torque acting in both directions of rotation between two structural elements, having an outer ring which at its inner wall face is provided with ramp type jamming tracks formed by recesses, the jamming tracks extending, starting from a zone of greatest radial extent of the recesses, in pairs symmetrically curved or flat up to a zone of least radial extent; having an inner element with a cylindrical jamming track at its outer wall face; having jamming rollers which are arranged in pairs extending between the jamming tracks of the outer ring and the inner element parallel to the longitudinal center axis thereof, and between which a compression spring provides for initial tension of the two jamming rollers in the direction of the ramp type end of the jamming track; and having a release system by which the jamming elements are shiftable into the zone of the recesses of greatest radial extent.

A clutch designed as a roller free-wheel of the aforesaid kind is known from WO-A-83/03 082. The respective clutch is intended for a steering wheel lock of a motor vehicle, the jamming rollers being arranged between a cylindrical jamming track of the steering column and a fixed housing provided with recesses. Each jamming roller of a jamming roller pair associated with the recess is guided in a cage, these cages, which have a scissor type actuating system, being moved toward each other at an identical pivot angle to disengage the clutch. Thereby both cages shift their jamming rollers into the zone of the recess of greatest radial extent. In this position of the cages, the steering column can be rotated relative to the housing. If, however, no displacement takes place at the scisser type actuating elements of the cages, the respective compression springs move the jamming rollers in the direction of the ramp type end of the jamming track of the housing, so that the steering column is locked relative to the housing. The disadvantages of the known system consist in that the clutch is of complex design, as a separate jamming roller free-wheel with cage and release system is provided for each of the two directions of rotation. The steering column, as has been set forth before, is to be lockable relative to the fixed housing in each of its positions by means of the clutch, the release system being associated with the fixed housing. If, for a different purpose of use, the inner shaft was to be made fixed and the outer element rotatable, it would be necessary to actuate the scissor type release system before each pivoting. This results in a more complex operation.

It is, therefore, the object of the invention to avoid these disadvantages and consequently to permit a revolving motion of the outer ring with the clutch disengaged, while reducing the complexity of operation required therefor and making the clutch compact and easy to manufacture.

The clutch of the invention is designed as roller free-wheel for transmitting a torque acting in both directions of rotation between two structural elements (24, 25), having an outer ring (1) which at an inner wall face (2) thereof is provided with ramp type jamming tracks (4,5) produced by recesses (3), the jamming tracks (4,5) extending, starting from a zone of greatest radial extent of the recess (3), in pairs, symmetrically curved or flat, up to a zone of at least radial extent; having an inner element (9) with a cylindrical jamming track (10) at an outer wall face thereof; having jamming rollers (6,7) which are arranged in pairs, extending between the jamming tracks (4,5,10) of outer ring (1) and inner element (9) parallel to the longitudinal center axis thereof and between the jamming rollers (6,7) of each pair, a compression spring (8) is disposed for initial tension of the two jamming rollers (6,7) in the direction of the ramp type ends of the jamming tracks (4,5); and having a release system (11) by which the jamming rollers (6,7) are shiftable into the zone of the recess (3) of greatest radial extent, is characterized in that the outer ring (1) has at least one circular edge (14) having a plurality of slots (16,17) positioned circumferentially along it that has finger-shaped drivers (12) which, secured on a common shifting sleeve (13), exactly one driver (12) in the shape of a finger is associated with each jamming roller (6,7), and the drivers (12), secured to a common shifting sleeve (13), are passed through slots (16,17) and are moveable with a clearing face (18,19) against a circumferential section of the jamming rollers (6,7) opposite the compression spring (8) and that each driver (12) has at its end opposite the respective clearing face (18,19) an entrainment face (20,21) which has associated with it in spaced relation an abutment face (29,30) delimiting the slot (16,17).

The problems of the prior art are solved in that the outer ring has at its end face at least one annular edge with sectionwise slots extending in circumferential direction; that the release system has comb-like drivers which, secured on a common shifting sleeve, are passed through the slots and are movable, by means of a clearing face, against the circumferential section of the jamming elements opposite the compression spring; and that at their ends opposite the respective clearing face the drivers have an entrainment face which has associated with it in spaced relation n abutment face delimiting the respective slot. Therefore, the release system assumes the additional function, besides disengaging the clutch, of displacing the outer ring relative to the inner element. As the entrainment face has a clearance in circumferential direction from the abutment face of the slot, there occurs firstly the disengagement of the jamming rollers acting in this direction of rotation, and immediately thereafter the drivers swivel the released outer ring relative to the inner element. Advantageously the direction of the release motion is identical with the direction of the displacement motion. The edge of the outer ring serves, besides the transmission of the swivel motion, for the end-face guiding and for protecting the roller free-wheel against dirt.

In one embodiment of the invention, the outer ring is to be secured via a second edge to a shaft, the inner element being designed as an inner ring, and the shaft is to be mounted in the inner ring by a journal. By this journal, which is guided in the inner ring via at least one rolling bearing designed as a needle bearing or via a sliding bearing, very exact guiding of the outer ring relative to the inner ring is achieved, an extremely compact construction being realized. In fact, these two elements are guided relative to each other not only via the jamming rollers. So $precis_e$ a support inside the clutch is required in particular for use thereof in office machines or precision engineering equipment.

The the clutch is to be provided for adjusting the back rest of a motor vehicle seat, there being connected to the inner element a fixed housing part or fitting part, to the outer ring a swivel axle of the back rest, and to the shifting sleeve an adjusting lever. The new design of the release system provided at the clutch as well as the guiding of the structural elements by a bearing of the outer ring relative to the inner element are suitable for this seat adjustment where single-lever operation and non-rotational locking of the seat module is essential. But moreover it is possible to provide the clutch according to the invention in conjunction with seat height adjustment or with a window raiser for motor vehicles.

The invention is not limited to the characteristics of the claims. There are also possibilities of combining individual claim characteristics with statements of advantages regarding the claims and with individual characteristics of the described embodiment example of the invention.

For further elucidation of the invention, reference is made to the drawing, in which an example of realization is shown in simplified form.

FIG. 1 shows an upper partial view of a clutch designed as a roller free-wheel, with a partial transverse section in the zone of a jamming roller pair, and FIG. 2 an upper partial view as longitudinal section along line II—II of the arrangement per FIG. 1.

In FIGS. 1 and 2, 1 denotes an outer ring which has at its inner wall face 2 a recess 3. By this recess 3 ramp type jamming tracks 4 and 5 are formed, which in the illustrated embodiment example run flat. The jamming tracks 4 and 5 start at the inner wall face 2, where recess 3 has its smallest radial extent, and extend up to a zone in which recess 3 has its greatest radial extent. This greatest radial extent may lie on a vertex. The two tracks 4 and 5 are symmetrical.

Each jamming track 4 and 5 is associated with a jamming roller 6 and 7, each pair of jamming rollers 6, 7 receiving in its interstice a compression spring 8, which tensions the two jamming rollers 6 and 7 oppositely in the direction of the ends of the ramp type jamming tracks 4 and 5. Further the illustrated clutch has an inner element designed as inner ring 9, which has a cylindrical jamming track 10 at its outer wall face.

The clutch further includes a release system 11, the comb-like drivers 12, 12a of which are arranged, starting from a shifting sleeve 13 and extending in axial direction concentrically to the outer ring 1 and to the inner ring 9. Each jamming roller 6, 7 is associated with a driver 12, 12a. At the end face of the outer ring i are edges 14 and 15. The drivers 12, 12a pass through slots 16 and 17 in the edge 14, one end of driver 12 turned toward a Jamming roller 6 or 7 forming a clearing face 18 and 19 spaced from the jamming rollers 6 and 7 when the release system is not being operated.

At the opposite ends, that is, the ends away from the jamming rollers 6 and 7, the drivers 12 are provided with entrainment faces 20 and 21. These entrainment faces in turn have a clearance relative to the respective end of the slots 16 and 17, the ends of the slots 16 and 17 having the function of an abutment face 29, 30.

As can be seen in particular from FIG. 2, the shifting sleeve 13 can be guided via a sliding bearing 22 at the inner ring 9 and can be operable by means of an adjusting lever 23. The inner ring is coupled positively with a housing part or fitting part 24, said positive union being able to be established by two segment type flattened portions of the circumference of the inner ring. The outer ring is coupled positively through its edge 15 with a shaft 25, namely in the form of a serration 26. The shaft is further provided at its end with a journal 27 which is mounted in the inner ring 9 by two needle bearings 28.

The operation of the clutch designed as a roller free-wheel is as follows:

In the position of the release system 11 shown in FIG. 1, the jamming rollers 6 and 7 are retained via the compression spring 8 at the jamming tracks 4, 5 and 10 and thus a torque is transmitted in both directions of rotation between the outer ring 1 and the inner ring 9. As the inner ring 9 occupies a fixed position relative to a housing part or fitting part 24, the outer ring 1 remains in this position. If via the adjusting lever 23 the shifting sleeve is pivoted clockwise in the view shown in FIG. 1, then first the clearing face 18 abuts against the jamming roller 6 and detaches it from the jamming track 4. Thereafter the driver 12a comes in contact via its entrainment face 21 with the abutment face 30 of edge 14. Driver 12a then pivots the outer ring 1 relative to the inner ring 9. But if the outer ring 1 is rotated at a greater angular speed, there occurs again a locking of outer ring 1 relative to inner ring 9 by the jamming roller 6.

A clutch designed according to the invention will have several pairs of jamming rollers 6 and 7 distributed evenly along the circumference. It can be seen from the embodiment example that with a release system 11 according to the invention a displacement of the structural elements relative to each other can be effected simultaneously in advantageous manner. The entire clutch can be produced cost-effectively and is compact. Another advantage of the arrangement is that the elements outer ring 1, inner ring 9 and shifting sleeve 13 are guided very precisely relative to each other due to the bearings 22 and 28 and the jamming rollers 6 and 7. The outer ring 1, provided with edges 14 and 15, offers the further advantage, besides the advantage of its entrainment by the driver 12, that the jamming tracks 4, 5 and 10 as well as the jamming rollers 6 and 7 are protected from dirt.

List of reference numbers

1 Outer ring
2 Inner wall face of 1
3 Recess
4 Jamming track
5 Jamming track
6 Jamming roller
7 Jamming roller
8 Compression spring
9 Inner ring
10 Jamming track of 9
11 Release system
12 Driver
12a a Driver
13 Shifting sleeve
14 Edge
15 Edge
16 Slot
17 Slot
18 Clearing face
19 Clearing face
20 Entrainment faces
21 Entrainment faces
22 Sliding bearing
23 Adjusting lever
24 Housing partor fitting part
25 Shaft
26 Serration
27 Journal
28 Needle bearing
29 Abutment face
30 Abutment face

We claim:

1. Clutch designed as roller free-wheel for transmitting a torque acting in both directions of rotation between two structural elements (24, 25), having an outer ring (1) which at an inner wall face (2) thereof is provided with ramp type jamming tracks (4,5) produced by recesses (3), the jamming tracks (4,5) extending, starting from a zone of greatest radial extent of the recess (3), in pairs, symmetrically curved or flat, up to a zone of least radial extent; having an inner element (9) with a cylindrical jamming track (10) at an outer wall face thereof; having jamming rollers (6,7) which are arranged in pairs, extending between the jamming tracks (4,5,10) of outer ring (1) and inner element (9) parallel to a longitudinal center axis thereof and between the jamming rollers (6,7) of each pair, a compression spring (8) is disposed for initial tension of the two jamming rollers (6,7) in the direction of the ramp type ends of the jamming tracks (4,5); and having a release system (11) by which the jamming rollers (6,7) are shiftable into the zone of the recess (3) of greatest radial extent, characterized in that the outer ring (1) has at least one circular edge (14) having a plurality of slots (16,17) positioned circumferentially along it, that the release system (11) has exactly one driver (12) in the shape of a finger associated with each jamming roller (6,7), and the drivers (12), secured to a common shifting sleeve (13), are passed through slots (16,17) and are moveable With a clearing face (18,19) against a circumferential section of the jamming rollers (6,7) opposite the compression spring (8); and that each driver (12) has at its end opposite the respective clearing face (18,19) an entrainment face (20,21) which has associated with it in spaced relation an abutment face (29,30) delimiting the slot (16,17).

2. Clutch designed as a roller free-wheel, according to claim 1, characterized in that the outer ring (1) is secured via a second edge (15) to a shaft (25); that the inner element is formed as an inner ring (9); and that the shaft (25) is mounted via a journal (27) in the inner ring (9).

3. Clutch designed as a roller free-wheel according to claim 1, characterized in that the clutch is intended for a back rest adjustment of a motor vehicle seat with a back rest, there being connected with the inner element (9) a fixed housing part or fitting part (24), with the outer ring (1) a swivel axle of the back rest, and with the shifting sleeve (13) an adjusting lever (23).

* * * * *